United States Patent [19]

Andrews

[11] 4,444,368

[45] Apr. 24, 1984

[54] SLOTTED VARIABLE CAMBER FLAP

[75] Inventor: Dana G. Andrews, Seattle, Wash.

[73] Assignee: The United States of America as represented by the Administrator of the National Aeronautics and Space Administration, Washington, D.C.

[21] Appl. No.: 315,588

[22] Filed: Oct. 30, 1981

[51] Int. Cl.$^3$ ................................................ B64C 9/20
[52] U.S. Cl. ..................................... 244/216; 244/215; 244/219; 244/212
[58] Field of Search ............... 244/216, 215, 219, 211, 244/212

[56] References Cited

U.S. PATENT DOCUMENTS 3,985,319 10/1976 Dean et al. .......................... 244/216
4,248,395 2/1981 Cole ..................................... 244/216
4,283,029 8/1981 Rudolph ............................. 244/216

Primary Examiner—Trygve M. Blix
Assistant Examiner—Ivy M. Shum
Attorney, Agent, or Firm—Howard J. Osborn; John R. Manning; Wallace J. Nelson

[57] ABSTRACT

Variable camber actuator assemblies 50 broaden the range of speeds at which lift to drag performance is maximized for slotted flap wings. Lift is improved over a broader range of cruising speeds by varying wing camber with rotational flap movements that do not introduce wing slots and induced drag. Forward flaps 40 are secured to forward flange links 26 which extend from, and are a part of, forward flap linkage assemblies 20. The forward flaps 40 rotate about flap pivots 39 with their rotational displacement controlled by variable camber actuator assemblies 50 located between the forward flaps and the forward flange links. Rear flaps 45 are held relative to the forward flaps 40 by rear flap linkage assemblies 70 which may act independently from the forward flap linkage assemblies and the variable camber actuator assemblies. Wing camber is varied by rotating the flaps with the variable camber actuator assemblies while the flaps are in a deployed or tucked position. Rotating flaps in a tucked position does not introduce significant wing surface discontinuities, and reduces aircraft fuel consumption on most flight profiles.

16 Claims, 4 Drawing Figures

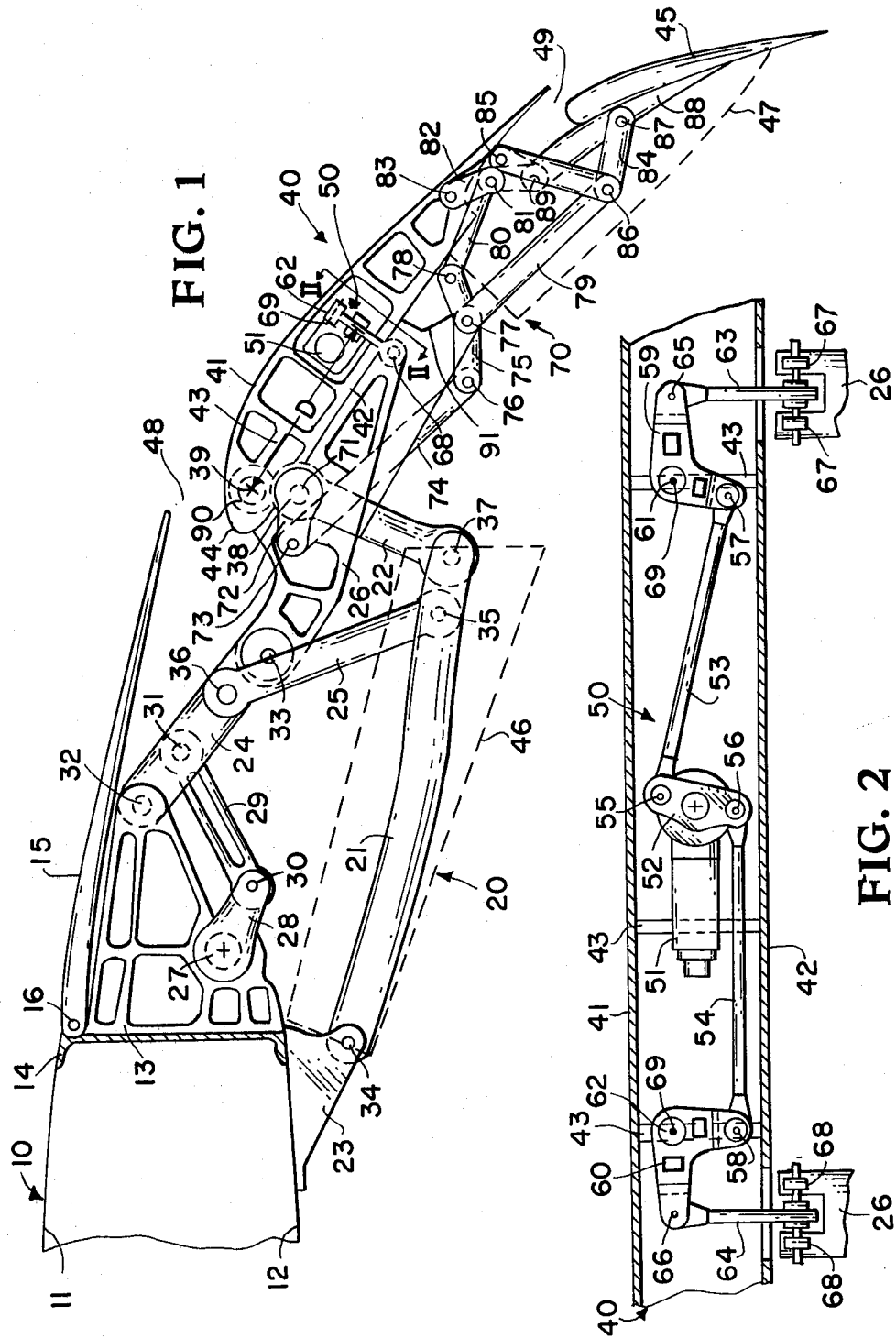

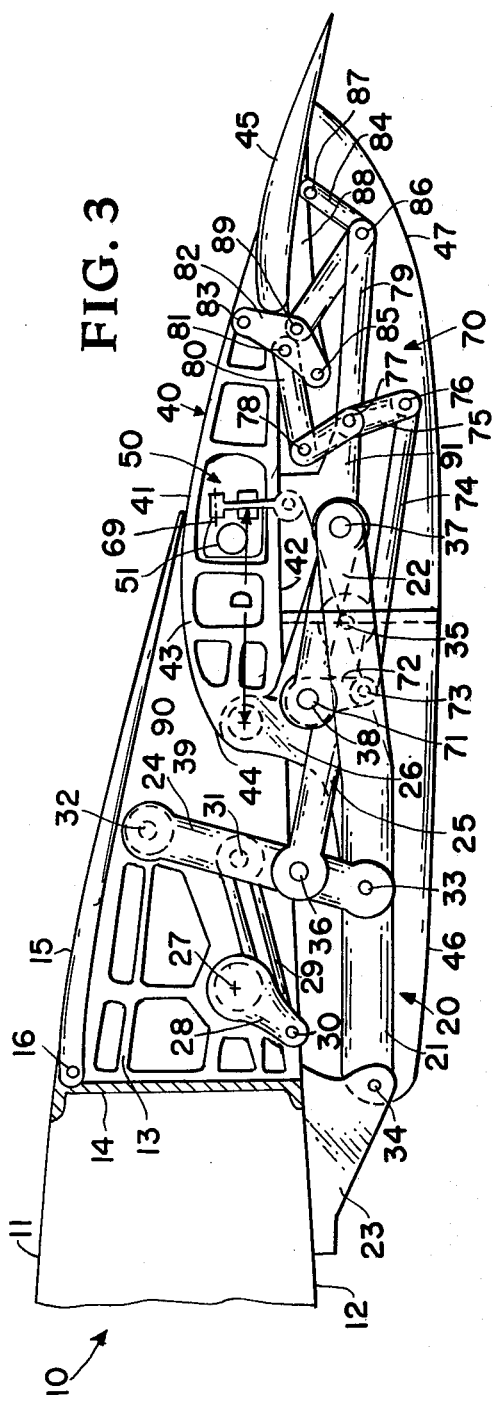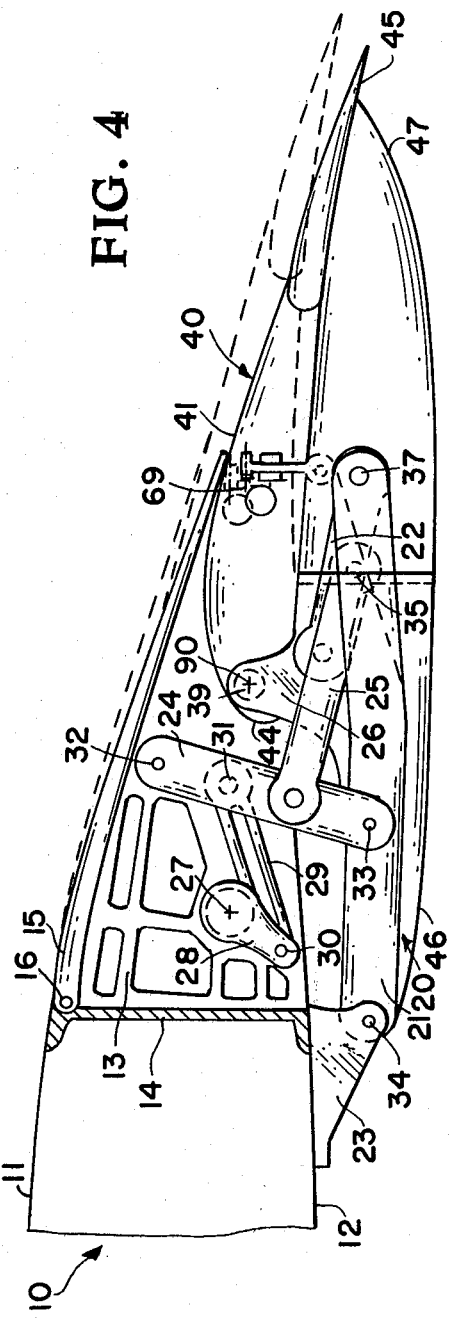

SLOTTED VARIABLE CAMBER FLAP

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention relates to wings having variable camber, and more particularly to wings having slotted trailing edge flaps that can be rotated, while in a tucked position, to vary wing camber without introducing wing surface discontinuities and drag.

The range of speeds having optimal lift to drag performance is increased by varying camber while maintaining smooth wing surfaces. Such wings use linkage assemblies located within the wing to bend flexible trailing edge surfaces longitudinally. These wings are more efficient over a greater range of cruising speeds than fixed camber wings, but are unable to increase wing chord and introduce slots within the aft portion to generate high lift during takeoffs and landings.

Slotted flaps increase wing lift during takeoffs and landings by increasing the wing's chord and camber while bleeding air from under the wing to the wing's upper, aft surface. Many types of external linkage assemblies have been developed to translate the flaps to a deployed position, but they introduce undesirable drag at cruise speeds. Nevermann et al (3,853,289) improved the prior art by providing an internal linkage assembly that does not introduce significant drag while the flaps are in a tucked position. Both external and internal linkage assemblies vary wing camber by translating the flaps aftward while opening slots within the wing. Slots substantially increase drag, and render existing slotted flap linkage assemblies undesirable for varying camber at cruise speeds.

Accordingly, it is an object of this invention to broaden optimal lift to drag performance of internal slotted flap wing asemblies by providing a device that varies wing camber while maintaining smooth wing surfaces.

Another object of this invention is to rotate slotted flaps about a flap pivot on forward flap linkage assemblies that varies wing camber without translational movement.

Another object of this invention is to provide variable camber actuator assemblies for controlling the rotational displacement of slotted flaps.

Another object of this invention is to provide flap linkage assemblies that control the position of forward and rear flaps relative to a midwing section, and operate independently from the variable camber actuators.

A further object of this invention is to provide contoured spoilers for keeping the wing surfaces smooth while slotted flaps are rotated.

SUMMARY OF THE INVENTION

The foregoing and other objects of the invention are achieved by rotating forward and rear flaps about flap pivots while forward and rear flap linkage assemblies hold the flaps in a tucked position. Forward flap linkage assemblies control the position of a forward flange link relative to a midwing section. Flap pivots secure forward flaps to the forward flange links, and allow the forward flaps to be rotated at either a tucked or a deployed position. Rear flap linkage assemblies may be operated independently from the forward flap linkages to control the position of the rear flaps relative to the forward flaps. Variable camber actuator assemblies are located between the forward flaps and the forward flange links to control flap rotational displacement by varying the linear displacement between the forward flaps and the forward flange links at a distance "D" from the flap pivots. Contoured spoilers are secured to the midwing section and extend over the forward flap linkage assemblies to maintain contact with the forward flaps while they are rotated in the tucked position. Rotating the flaps varies slotted flap wing camber without translational flap movement that would otherwise introduce slots and high drag at cruise speeds.

BRIEF DESCRIPTION OF THE DRAWINGS

FIG. 1 is a cross-sectional view of a slotted flap, variable camber wing, showing the flaps in a deployed position;

FIG. 2 is a sectional view of FIG. 1, along line II—II, showing the variable camber actuator assemblies in greater detail;

FIG. 3 is a cross-sectional view of the slotted flap variable camber wing shown in FIG. 1, showing the flaps and linkage assemblies in a tucked position; and FIG. 4 is a view of the wing in FIG. 3 with the rear linkage assembly not shown to more clearly demonstrate how variable camber actuator assemblies rotate flaps while in a tucked position.

DETAILED DESCRIPTION OF THE INVENTION

FIG. 1 reveals a midwing section 10 composed essentially of upper and lower skin surfaces, 11 and 12, attached to midwing section ribs 13 and spars 14. The spar 14 shown in FIG. 1 is the rear most spar of the fixed, midwing section. Midwing ribs 13 provide lateral support to the midwing section and also support forward flap linkage assemblies, generally designated 20.

Forward flap linkage assemblies 20 are actuated to translate forward flange links 26 with some rotational motion toward the midwing section 10. Midwing torque tubes 27, mounted within the midwing ribs 13, rotate forward drive arms 28 that are connected at pivots 30 to forward drive links 29. The forward drive links 29 are also connected by pivots 31 to forward main links 24. Forward main links 24 rotate about pivots 32 located in ribs 13, and are connected by pivots 33 to forward flange links 26. Forward flanges 23 are secured to the midwing section 10, and support forwad first positioning links 21 at pivots 34. Forward first positioning links 21 are interconnected with the forward main links 24 by forward programming links 25 at pivots 35 and 36. Connected to the forward first positioning links 21 at pivots 37 are forward second positioning links 22 that are also connected by pivots 38 to the forward flange links 26.

Flexible contoured spoilers 15 are secured to the rear most midwing spars 14 at points 16. The flexible contoured spoilers 15 maintain smooth upper wing surfaces by extending aftward from the midwing section 10, and maintaining contact with forward flap upper surfaces 41 while the forward flaps 40 are in the tucked position.

Actuating the midwing torque tubes 27 rotates forward drive arms 28, forward main arms 24 and forward first positioning links 21; these links in combination with forward second positioning links 22 control the combined translational and rotational motion of the forward flange links 26. Pure rotation of forward flange links 26 is not possible by actuating the forward flap linkage assemblies 20. The forward flap linkage assemblies 20 rotate forward flange links 26 with a translational motion to open slots 48 between flexible contoured spoilers 15 and forward flaps 40 that increase wing chord and lift during takeoffs and landings.

The forward flaps 40 include upper and lower skin surfaces, 41 and 42, separated by forward flap ribs 43, and are connected by flap pivots 39, located at forward flap leading edges 44, to the forward flange links 26. The forward flaps 40 rotate about flap pivots 39 while the forward flap linkage assemblies 20 are in either a tucked or a deployed position.

Variable camber actuator assemblies control the degree of flap rotation about flap pivots 39. In the preferred embodiment, variable camber actuator assemblies, generally designated 50, control flap rotation by varying the distance between forward flap lower skin surfaces 42 and forward flange links 26 at a distance "D" from the flap pivots 39.

FIG. 2, a view along line II—II in FIG. 1, reveals how the camber actuator assemblies 50 are constructed and operated. Actuators 51 are secured to forward flap ribs 43, and rotate actuator drive arms 52. Actuator drive links, 53 and 54, are connected by pivots 55, 56, 57 and 58 to drive arms 52 and actuator bellcranks 59 and 60. The actuator bellcranks, 59 and 60, rotate about centerlines 69 of actuator bellcrank pivots 61 and 62 which are attached to forward flap ribs 43. Actuator displacement links, 63 and 64, are connected to actuator bellcranks 59 and 60 by pivots 65 and 66, and to the forward flange links 26 by actuator pivots 67 and 68. Rotating actuator drive arms 52 counter-clockwise causes actuator bellcranks 59 and 60 to push actuator displacement links 63 and 64 downward; this motion moves the forward flaps 40 away from the forward flange links 26 at pivots 67 and 68 and rotates the forward flaps 40 about the flap pivots 39.

An alternate means of rotating the forward flaps 40, as shown in FIG. 1, is to place actuator torque tubes 90 within flap pivots 39. The actuator torque tubes 90 are secured to both the forward flange links 26 and the forward flap ribs 43, and rotate the forward flaps 40 about the flap pivots 39. Rotating the forward flaps 49 with actuator torque tubes 90 alleviates the need of variable camber actuator assemblies 50 described in the preferred embodiment.

FIG. 1 of the preferred embodiment also shows rear flap linkage assemblies 70 interconnected with, and actuated by, the forward flap linkage assemblies 20. Rear drive arms 72 are held in a fixed position relative to forward second positioning links 22, and rotate about pivots 38. Rear drive links 74 are connected by pivots 73 and 76 to rear drive arms 72 and rear first programming links 75. The rear first programming links 75 rotate about pivots 77, located on rear flanges 91 extending from the forward flaps 40, and are connected by pivots 78 to rear second programming links 80. Second programming links are connected by pivots 81 to rear main links 82 that rotate about pivots 83, located on the forward flaps 40, and are also connected by pivots 85 and 89 to rear second positioning links 84 and rear flange links 88. Rear first positioning links 79 are connected by pivots 77 and 86 to the rear flanges 91 and the rear second positioning links 84. Rear second postioning links 84 are also connected to the rear flange links 88 at pivots 87 to control rotation of the rear flaps 45 while rear main links 82 primarily translate the rear flaps.

Actuating the forward flap linkage assemblies 20 rotates forward second positioning links 22 and rear drive arms 72 equally about pivot 38. The rear drive arms 72 rotate rear second programming links 75 and rear main links 82 that prescribe the position of the rear flange links 88; thus, the rear flaps 45 are translated aftward with a combined rotational motion.

A variation of the preferred embodiment that allows independent actuation of the forward and rear flap linkage assemblies is to place rear linkage torque tubes 71 within pivots 38. Pivots 38 allow free rotation of forward second positioning links 22 with respect to forward flange links 26, while rear linkage torque tubes 71, secured to both the rear drive arms 72 and the forward flange links 26, rotate the rear drive arms 72 independently from the forward flap linkage assemblies 20.

Fairings shown in FIGS. 1 and 3, may also be incorporated into the preferred embodiment to reduce drag, and protect the linkage assemblies while in flight. Forward fairings 46 are secured to forward first positioning links 21, and envelop the forward flap linkage assemblies 20 along the wing's lower surfaces. Rear fairings 47 secured to rear flange links 88, envelop the rear flap linkage assemblies 70. The forward edges of the rear fairings are held against, and within, the rear edges of the forward fairings, when the flaps, 40 and 45, are tucked. Thus, smooth lower wing surfaces are maintained by the fairings while the flaps are rotated in a tucked position.

OPERATION OF THE INVENTION

Forward flap linkage assemblies 20 are moved from a deployed to a tucked position, shown in FIGS. 1 and 3, by rotating torque tubes 27 and forward drive arms 28 clockwise with a prime mover (not shown). This moves forward drive links 29 downward, and rotates the forward main links 24 clockwise about pivots 32. Forward flange links 26 are moved toward wing midsections 10 along an arc path traveled by pivots 33. Forward first positioning links 21 are initially rotated clockwise about pivots 34 by forward programming links 25 until pivots 33, 35 and 36 are co-linear; then the forward first positioning links 21 will rotate counter clockwise until the flaps are translated to a tucked position as shown in FIG. 3. Forward second positioning links 22 rotate counter clockwise about pivots 37, and determine the rotation of forward flange links 26 about pivots 33 as the forward flange links are translated toward wing midsection 10.

Rear flap linkage assemblies 70 are described in the preferred embodiment as being directly driven by forward flap linkage assemblies 20. Forward second positioning links 22 and rear drive arms 72 both rotate counterclockwise about pivots 38 as the flaps are retracted. The counterclockwise motion is translated via rear drive links 74 to first programming links 75 that rotate rear main links 82 clockwise about pivots 83. Rear main links define the path of pivots 85 relative to forward flaps 40, and causes rear second positioning links 84 to rotate counterclockwise about pivots 85. Rear first positioning links 79 initially rotate clockwise about pivots 77 until pivots 83, 85 and 86 ar co-linear; then the direction of rotation is reversed. The rear flange links 88 are then translated toward the forward flaps 40, with their relative rotation controlled by the rear second positioning links 84.

Counterclockwise rotation of actuators 51, shown in FIG. 2, rotates actuator bellcranks 59 and 60 about actuator bellcrank pivots 61 and 62. Both actuator bellcranks then move actuator displacement links 63 and 64 downward toward forward flange links 26. The actuator displacement links are connected to the forward flange links by pivots 67 and 68, and therefore move the forwad flaps 40 away from the forward flange links 26 by a distance equal to their relative downward movement with respect to the forward flaps 40. Locating the variable camber actuator assemblies 50 a distance "D" from the flap pivots 39 causes forward flap rotation about flap pivots 39 equal to the arc sine of the distance moved by actuator displacement links 63 and 64 divided by "D".

FIG. 4 shows forward and rear flap held in tucked positions for various displacements of the variable camber actuation assemblies. The rear flap linkage assemblies 70 are not shown so that phantom positions of the flaps and variable camber actuation assemblies can be seen more clearly. Solid lines show the forward flaps 40 held against the forward flange links 26, and phantom lines show the flaps and variable camber actuation assemblies in a rotated position, caused by moving the actuation displacement links, 63 and 64, downward. Actuating the variable camber actuator assemblies 50 also rotates the rear flaps 45 with a slight translational motion with respect to the forward flaps 40. Counter clockwise rotation of the forward flaps 40, shown in FIG. 3, causes pivots 83 to move upward with respect to the forward flange link 26. This motion induces a slight counter clockwise rotation on rear main links 82, and translates the rear flaps 45 slightly aftward without introducing slots 49 between the forward and rear flaps, as shown in FIG. 1.

FIGS. 3 and 4, also show contoured spoilers 15 that remain in contact with forward flap upper surfaces 41 during the full range of flap rotation caused by the variable camber actuators 50.

Wind tunnel tests indicate a 4–6% increase in slotted flap wing efficiency when wing camber is varied to match speeds and loads for typical transcontinental air transports. Transcontinental air transport flight profiles include climb and descent phases, as well as, some fluxuations at cruise that reduce the efficiency of slotted flap wing assemblies. Variable camber actuation improves wing efficiency by maintaining optimal L/D for speeds ranging from M=0.8 to 0.85, and improves L/D for all other speeds.

Although the invention has been described relative to particular embodiments thereof, there are obviously numerous variations and modifications readily apparent to those skilled in the art in light of the above teachings. It is therefore to be understood that the invention may be practiced other than as specifically described.

What is claimed as new and desired to be secured by Letters Patent of the United States is:

1. A device for varying slotted flap wing camber comprising:
    a wing having upper and lower surfaces;
    flap means including trailing edge forward and aft flaps for increasing chord and lift of said wing;
    actuator means for controlling translation of said flap means thereby increasing chord and lift of said wing;
    flap linkage assembly means for supporting said flap means, and translating said flap means from a tucked to a deployed position;
    flap pivot means for attaching said flap means to said flap linkage assembly means, and allowing said flap means to rotate with respect to said flap linkage assembly means; and
    variable camber actuator means for independently controlling rotation of said trailing edge forward and aft flaps with respect to said flap linkage assembly means and for controlling rotation independent of translational movement of said flap means, whereby the camber of said wing is varied by rotating said flap means.

2. A device as in claim 1 wherein said variable camber actuator means includes a torque tube means, located at said flap pivot means, for rotating said flap means.

3. A device as in claim 1 wherein said variable camber actuator means has a variable linear displacement, and is connected to said flap means and said flap linkage assembly means, away from said flap pivot means, for controlling said rotation of said flap means by varying said linear displacement.

4. A device as in claim 1 wherein:
    said flap linkage assembly means includes, and controls the relative position of a flange link means to said wing;
    said flap pivot means is located on said flange link means; and
    said variable camber actuator means is attached to said flange link means and said flap means, away from said flap pivot means, for controlling said rotation.

5. A device as in claim 1 further comprising spoiler means attached to said wing for minimizing discontinuities on said upper wing surfaces while said flap means are rotated at said tucked position.

6. A device as in claim 1 wherein said flap means includes a forward and rear flap, said flap linkage assembly means includes a forward and rear flap linkage assembly means that may be actuated independently from each other and independently from said variable camber actuator means.

7. A device as in claim 4 wherein said variable camber actuator means rotates said flap means at said tucked position while maintaining said upper wing surfaces smooth.

8. A device for varying slotted flap wing camber comprising:
    a wing having upper and lower surfaces;
    flap means for increasing chord and lift of said wing;
    flap linkage assembly means for supporting said flap means, and translating said flap means from a tucked to a deployed position;
    flap pivot means for attaching said flap means to said flap linkage assembly means, and allowing said flap means to rotate with respect to said flap linkage assembly means;
    variable camber actuator means for controlling rotation of said flap means with respect to said flap linkage assembly means, whereby the camber of said wing is varied by rotating said flap means, said actuator means, attached to said flap means rotating an actuator drive arm means;
    actuator drive link means, pivotally connected to said actuator drive arm means, for transferring displacements of said actuator drive arm means;

actuator bellcrank means having arms extending from actuator bellcrank pivots on said flap means, for redirecting linear displacements from said actuator drive links; and actuator displacement link means, pivotally attached to said arm means extending from said actuator bellcrank means and said flap linkage means, whereby said variable camber actuator means rotates said flap means for varying the relative distance between the centerlines of said actuator bellcrank pivots and said pivots joining said actuator displacement link means to said flap linkage assembly means.

9. A device as in claim 1 further comprising fairing means for protecting said flap linkage assembly means, and reducing drag during flight.

10. A device as in claim 8 wherein said flap linkage assembly means includes:

main link means, pivotally connected to programming link means and flange link means, and rotating longitudinally aftward from said wing, for guiding said flange link means from said tucked to said deployed position;

first positioning link means, pivotally connected to said wing, said programming link means and second positioning link means;

said programming link means controls the relative degree of rotation between said first positioning link means and said main link means; and said second positioning link means is also pivotally connected to said flange link means for controlling the rotational and translational displacement of said flange link means relative to said wings.

11. A device as in claim 10 wherein said flap linkage assembly means includes:

forward and rear flap linkage assembly means for translating said flap means;

said flap means includes a forward and rear flap, wherein said rear flap is retracted by said rear flap linkage assembly means into the rear area of said forward flap; and said rear linkage assembly means is attached to said flange link means within said forward linkage assembly means, and may be actuated independently therefrom.

12. A device as in claim 10 wherein said flap linkage assembly means further includes:

torque tube means, attached to said wing for rotating a drive arm extending therefrom; and drive link means, pivotally connected to said drive arm means and said main link means, for transferring rotational displacement from said drive arm means to said main link means.

13. A method for varying the camber of slotted flap wings consisting of:

providing a slotted flap wing assembly having a midsection, flap linkage assemblies, and trailing edge forward and aft flaps;

providing flap pivots on the flap linkage assemblies for a forward-most flap;

providing actuators to control translation of the flap linkage assemblies;

providing variable displacement linkages, attached to the forward-most flap and the flap linkage assemblies;

rotating the forward-most flap about flap pivots; and controlling rotation of the forward-most flap with the variable displacement linkages, whereby the camber of a wing is varied by independently rotating the trailing edge forward and aft flaps at various translational positions of the flap linkage assemblies.

14. A method for varying the camber of a slotted flap wing as in claim 13 further including the steps of:

locating the variable displacement linkages away from the flap pivots; and controlling flap rotation by varying the distance between the flap linkage assemblies and the forward-most flaps at the variable displacement linkages, whereby flaps other than the forward-most flap are deployed by flap linkage assemblies that extend from the forward-most flap.

15. A method for varying slotted flap wing camber as in claim 13 including the steps of:

providing a contoured spoiler extending aftward from the midwing section; and maintaining contact between the contoured spoiler and the forward-most flap while the flaps are rotated in a tucked position, whereby the wing's surfaces are smooth while the flaps are rotated in a tucked position.

16. A method for varying slotted flap wing camber as in claim 13 including the steps of:

providing fairings along lower wing surfaces and attached to the flap linkage assemblies; and maintaining smooth lower wing surfaces with the fairings while the flaps are in tucked positions.

* * * * *